(12) United States Patent
Morishita

(10) Patent No.: US 11,934,714 B2
(45) Date of Patent: Mar. 19, 2024

(54) IMAGE FORMING APPARATUS AND METHOD FOR CONTROLLING IMAGE FORMING APPARATUS

(71) Applicant: SEIKO EPSON CORPORATION, Tokyo (JP)

(72) Inventor: Kazuya Morishita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/068,021

(22) Filed: Dec. 19, 2022

(65) Prior Publication Data

US 2023/0195392 A1    Jun. 22, 2023

(30) Foreign Application Priority Data

Dec. 21, 2021  (JP) ................. 2021-206756

(51) Int. Cl.
*G06F 15/00* (2006.01)
*G06F 3/12* (2006.01)

(52) U.S. Cl.
CPC ............ *G06F 3/1212* (2013.01); *G06F 3/121* (2013.01); *G06F 3/1234* (2013.01); *G06F 3/126* (2013.01); *G06F 3/128* (2013.01)

(58) Field of Classification Search
CPC ...... G06F 3/1212; G06F 3/121; G06F 3/1234; G06F 3/126; G06F 3/128
USPC ....................................... 358/1.14
See application file for complete search history.

(56) References Cited

U.S. PATENT DOCUMENTS

| 6,256,473 B1 * | 7/2001 | Kamanuma ........ H04N 1/00957 |
| | | 399/370 |
| 7,944,571 B2 * | 5/2011 | Higuchi ............... H04N 1/2369 |
| | | 358/1.9 |
| 2005/0025167 A1 * | 2/2005 | Ishibashi ................. H04L 12/56 |
| | | 370/395.2 |

FOREIGN PATENT DOCUMENTS

| JP | H08-008935 A | 1/1996 |
| JP | 2007-314334 A | 12/2007 |

* cited by examiner

*Primary Examiner* — Mark R Milia
(74) *Attorney, Agent, or Firm* — WORKMAN NYDEGGER

(57) ABSTRACT

There is provides an image forming apparatus including a main body control apparatus including a main body memory, a main body cassette, and additional cassettes different from the main body cassette and communicably coupled to the main body control apparatus. The main body memory has transmission queues that are provided for the respective additional cassettes communicably coupled to the main body control apparatus and temporarily store commands to be transmitted to the additional cassettes. When a plurality of commands are stored in each of the transmission queues, the main body control apparatus carries out for each of the transmission queues the process of generating a first combined command that is the combination of the plurality of commands stored in the transmission queue, and transmitting the first combined command to the additional cassette.

9 Claims, 7 Drawing Sheets

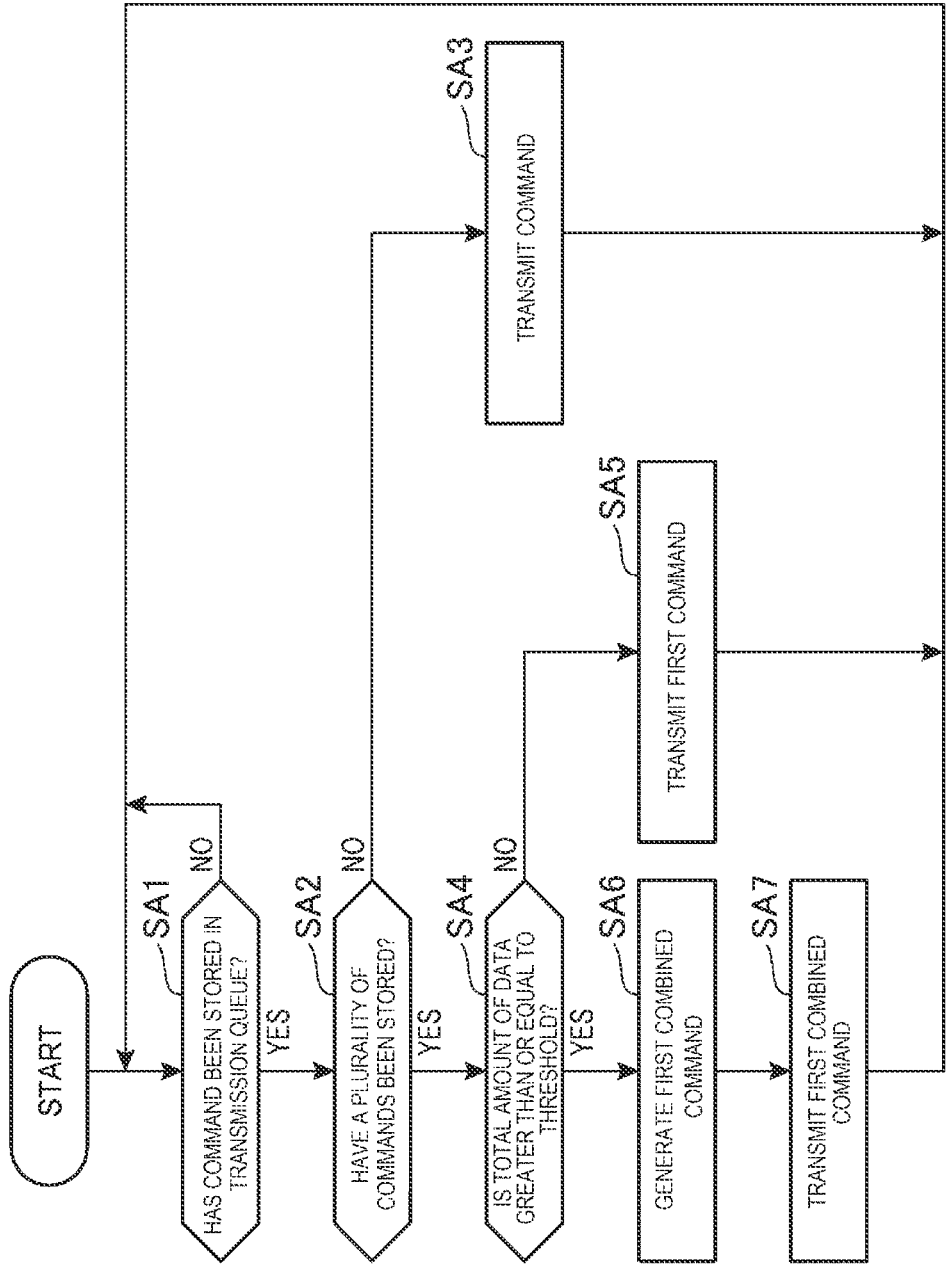

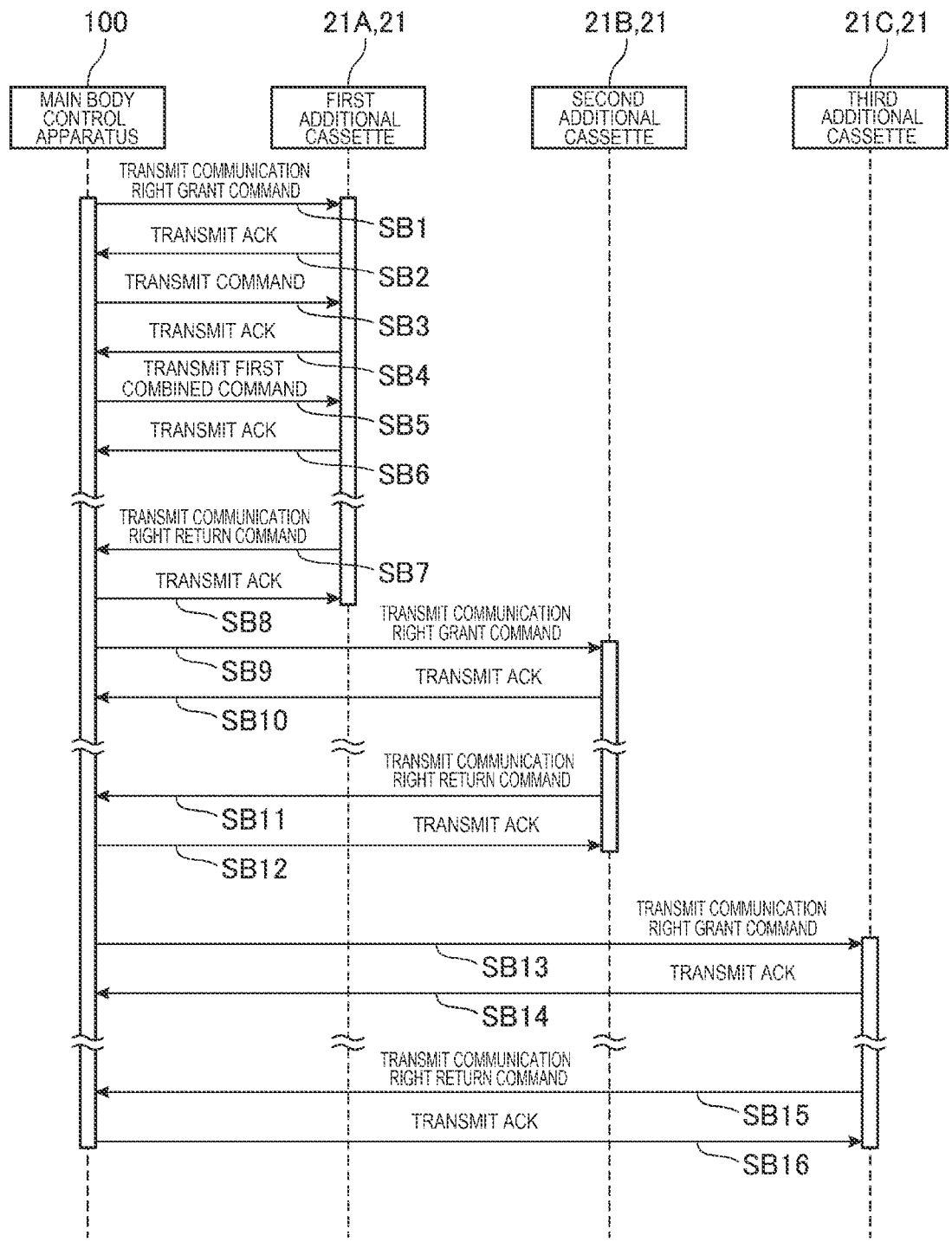

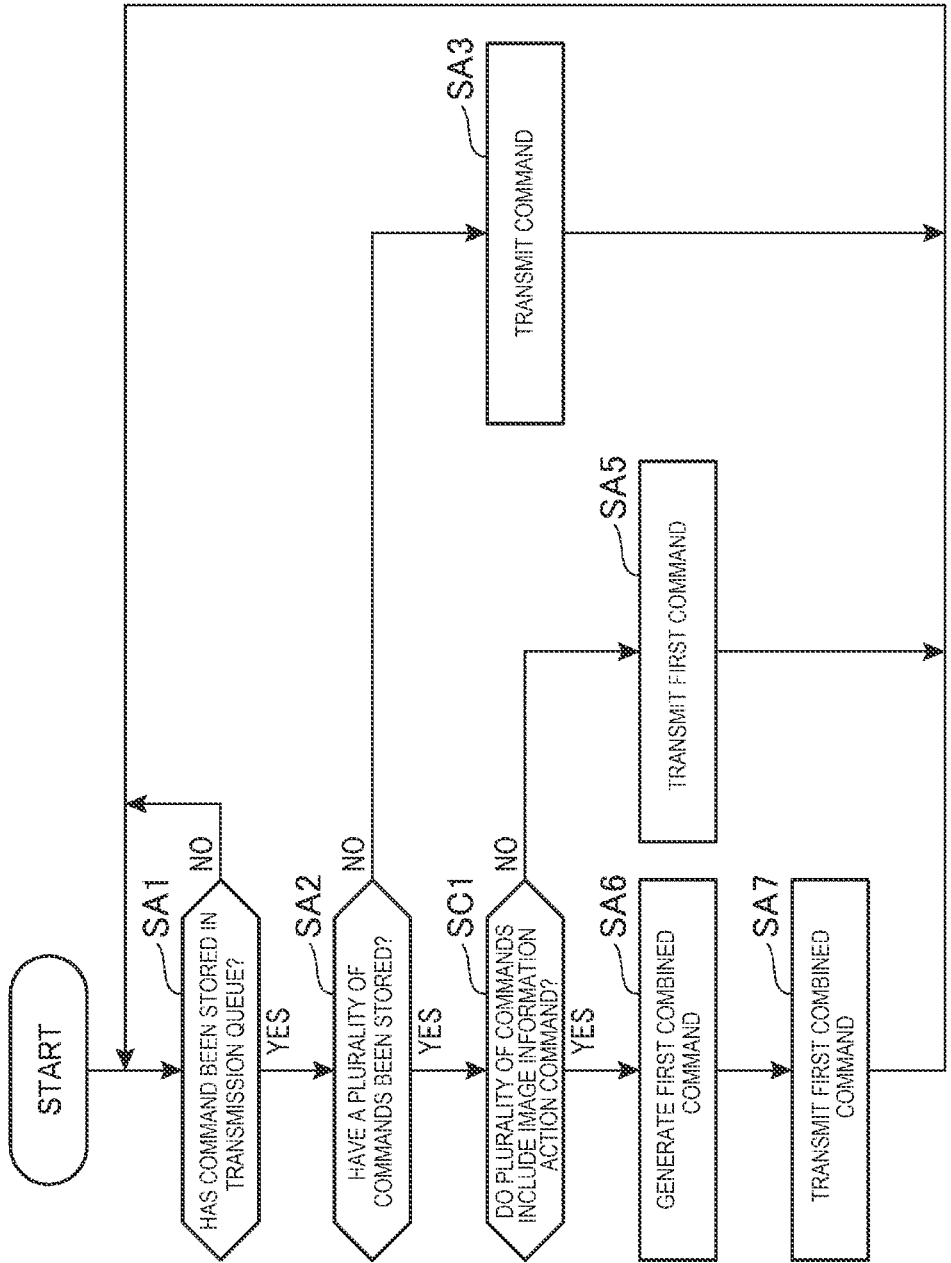

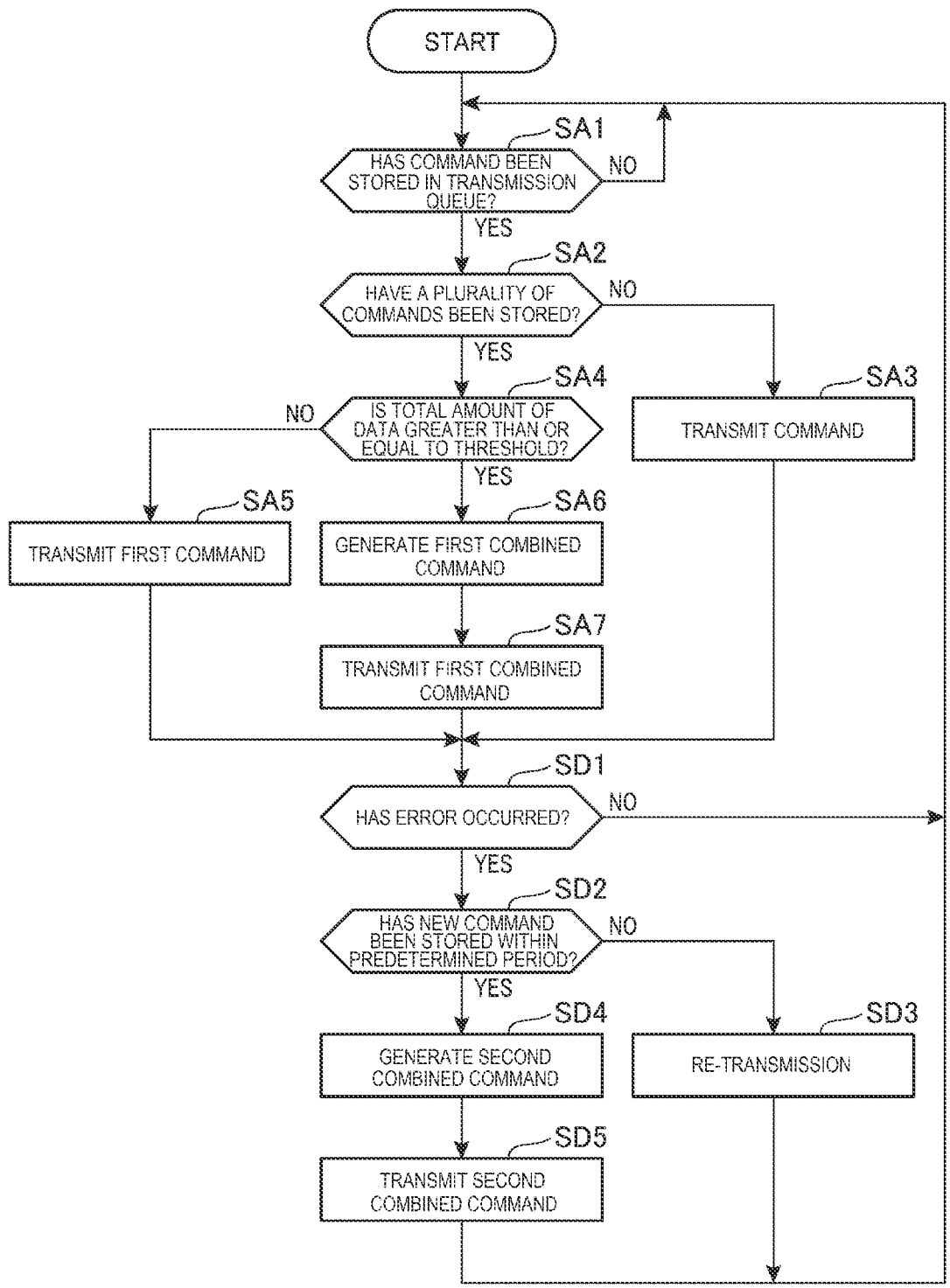

IMAGE FORMING APPARATUS AND METHOD FOR CONTROLLING IMAGE FORMING APPARATUS

The present application is based on, and claims priority from JP Application Serial Number 2021-206756, filed Dec. 21, 2021, the disclosure of which is hereby incorporated by reference herein in its entirety.

BACKGROUND

1. Technical Field

The present disclosure relates to an image forming apparatus and a method for controlling the image forming apparatus.

2. Related Art

There is a known image forming apparatus including cassettes that can contain media, such as paper sheets. For example, JP-A-8-008935 discloses an image forming apparatus including a plurality of additional cassettes coupled to an apparatus main body via a bus. The image forming apparatus described in JP-A-8-008935 identifies one of the additional cassettes, and the apparatus main body instructs the identified additional cassette to carry out a predetermined process.

Some image forming apparatuses, such as that described in JP-A-8-008935, have a configuration in which a control apparatus sequentially transmits data to a cassette in the control of the cassette. In an image forming apparatus of this type, however, the larger the amount of data to be transmitted is, the greater delay there can be in transmitting other data. There is therefore room for improvement in increase in the speed of cassette control in an image forming apparatus of this type.

SUMMARY

An aspect that solves the problem described above relates to an image forming apparatus including a control apparatus including a storage, a first cassette, and a second cassette different from the first cassette and communicably coupled to the control apparatus. The storage has transmission queues that temporarily store data to be transmitted to the second cassette. When a plurality of sets of data are stored in the transmission queues, the control apparatus carries out for each of the transmission queues the process of generating first combined data that is a combination of the plurality of sets of data stored in the transmission queues, and transmitting the first combined data to the second cassette.

Another aspect that solves the problem described above relates to a method for controlling an image forming apparatus including a control apparatus including a storage, a first cassette, and second cassettes different from the first cassette and communicably coupled to the control apparatus. The storage has the transmission queues that temporarily store data to be transmitted to the second cassettes for each of the second cassettes communicably coupled to the control apparatus. When a plurality of sets of data are stored in the transmission queues, the control apparatus carries out for each of the transmission queues the process of generating first combined data that is a combination of the plurality of sets of data stored in the transmission queues, and transmitting the first combined data to the second cassettes.

BRIEF DESCRIPTION OF THE DRAWINGS

FIG. 4 is a flowchart showing the action of a second main body communication controller.

FIG. 5 is a sequence diagram showing an example of the action of the image forming apparatus.

FIG. 6 is a flowchart showing the action of the second main body communication controller.

FIG. 7 is a flowchart showing the action of the second main body communication controller.

DESCRIPTION OF EXEMPLARY EMBODIMENTS

An embodiment will be described below with reference to the drawings.

Figure 1:
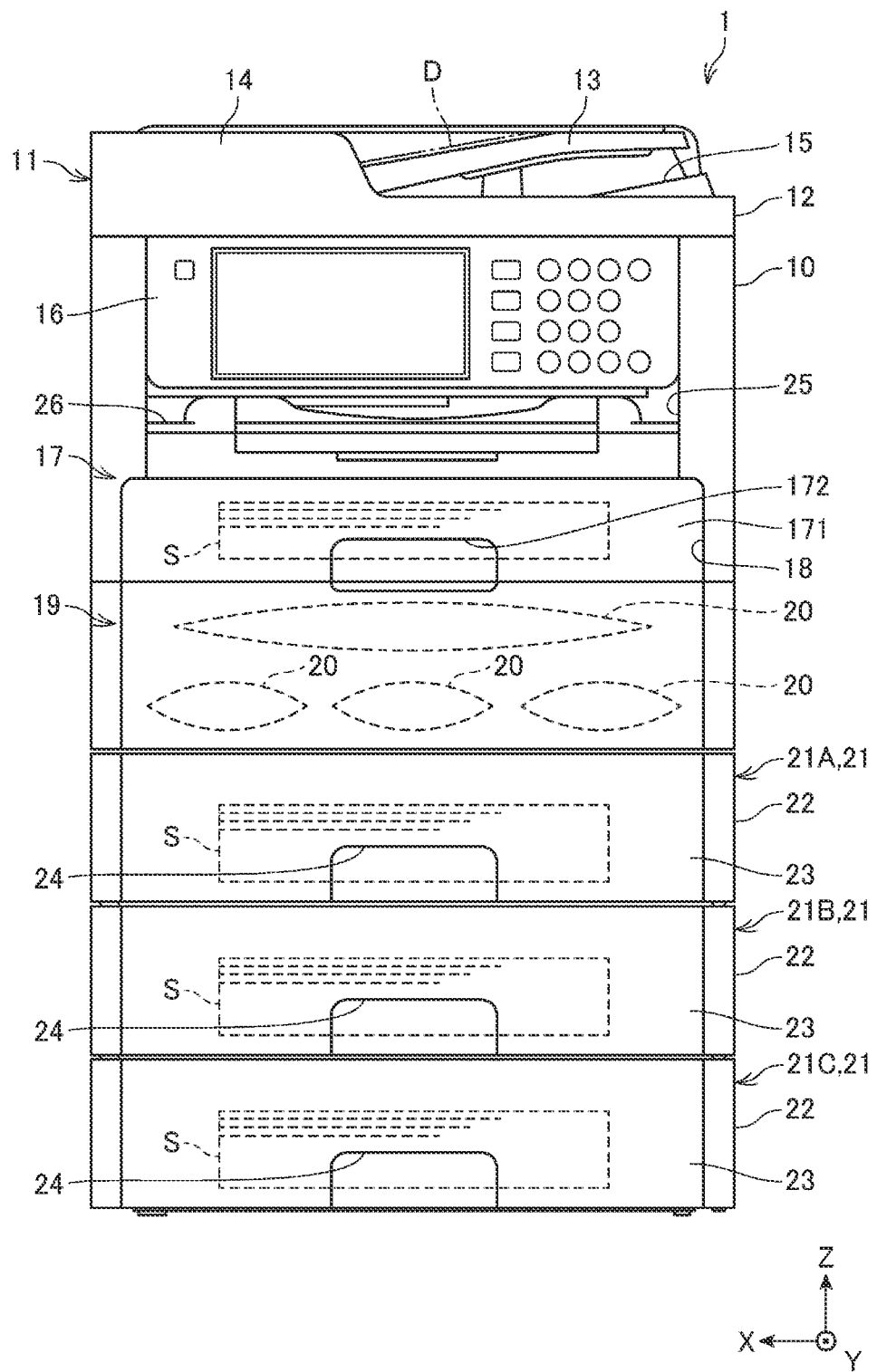
FIG. 1 is a front view showing an image forming apparatus.
Figure 2:
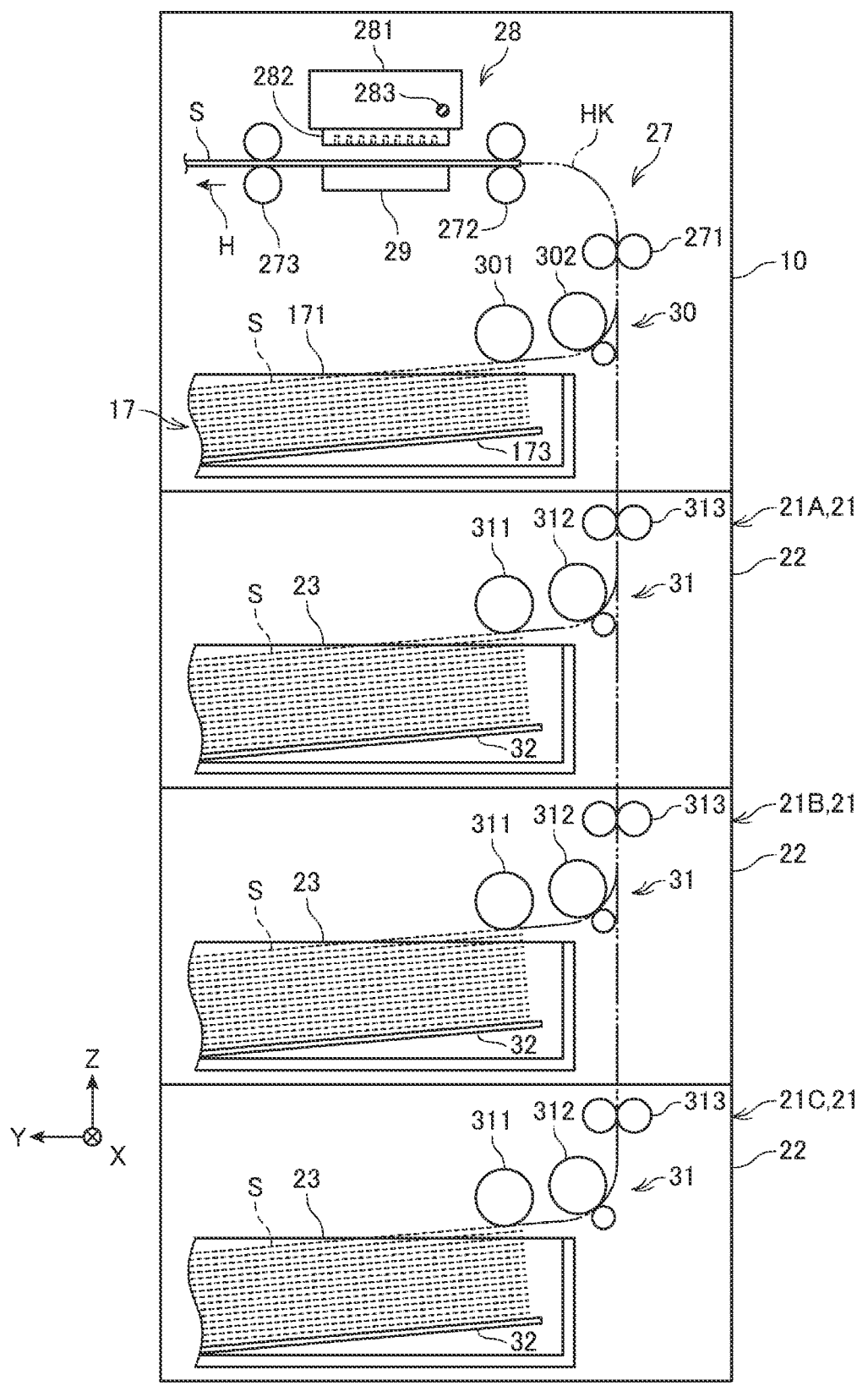
FIG. 2 diagrammatically shows a side cross section of the image forming apparatus.

FIGS. 1 and 2 show axes X, Y, and Z. The axes X, Y, and Z are perpendicular to each other. The axis Z represents the upward-downward direction and the vertical direction in the state in which an image forming apparatus 1 is installed. The axes X and Y are parallel to the horizontal direction. The axis Y represents the frontward-rearward direction of the image forming apparatus 1. The axis X represents the rightward-leftward direction of the image forming apparatus 1. The positive direction of the axis Z represents the upward direction. The positive direction of the axis Y represents the frontward direction. The positive direction of the axis X represents the leftward direction. The forward-facing surface of the image forming apparatus 1 is the front surface of the image forming apparatus 1.

FIG. 1 is a front view showing the image forming apparatus 1.

The image forming apparatus 1 according to the present embodiment is called a multifunction peripheral (MFP), and is a multifunctional machine having a variety of functions, such as image formation, facsimile, and scanning.

The image forming apparatus 1 includes a reading unit 11 at the top of an apparatus main body 10. The reading unit 11 includes a cover 12, which is provided at the upper surface of the apparatus body 10 and can be opened and closed, a document tray 13, which is mounted on the cover 12, and an automatic document feeder 14. The reading unit 11 reads a document D, which the automatic document feeder 14 conveys one at a time from the document tray 13, or a document D placed on a glass table exposed when the cover 12 is opened. The document D read by the reading unit 11 is discharged onto a discharge tray 15.

An operation panel 16 is provided at an upper front portion of the apparatus main body 10. The operation panel 16 includes a plurality of operation switches, a display, a touch panel, and other devices.

The image forming apparatus 1 includes a main body cassette 17. The main body cassette 17 is provided in a recess 18 formed in the apparatus main body 10 at a position below the operation panel 16. The main body cassette 17 includes a main body tray 171, which can contain media S, such as paper sheets, which are stacked on each other. The main body tray 171 can contain one or more media S. A grip 172, which a user uses to pull out the main body tray 171, is formed at the front surface of the main body tray 171.

The main body cassette 17 is an example of a "first cassette".

The image forming apparatus 1 includes an ink container 19 below the main body cassette 17. The ink container 19 contains ink packs 20, which are ink supply sources. The ink container 19 contains a plurality of ink packs 20, which contain inks having colors different from one another.

The image forming apparatus 1 includes a first additional cassette 21A, a second additional cassette 21B, and a third additional cassette 21C below the apparatus main body 10. In the following description, when the first additional cassette 21A, the second additional cassette 21B, and the third additional cassette 21C are not distinguished from one another, the additional cassettes are collectively referred to as "additional cassettes" followed by a reference number "21".

The additional cassettes 21 are an example of a "second cassette".

The first additional cassette 21A, the second additional cassette 21B, and the third additional cassettes 21C have substantially the same configuration. Therefore, in the description of the configuration of the additional cassettes 21 with reference to FIG. 1, the configuration of the first additional cassette 21A will be described as a representative additional cassette, and the configurations of the second additional cassette 21B and the third additional cassette 21C will not be described.

The first additional cassette 21A includes an enclosure 22 and an additional tray 23 incorporated in the enclosure 22. The additional tray 23 can contain one or more media S. The number of media S containable in the additional tray 23 may be greater or smaller than or equal to the number containable in the main body cassette 17. A grip 24, which the user uses to pull out the additional tray 23, is formed at the front surface of the additional tray 23.

When receiving image formation data from an external apparatus such as a PC (personal computer), the image forming apparatus 1 identifies a cassette corresponding to information on the media S indicated by the received image formation data and conveys a medium S from the identified cassette. The image formation data contains the information on the media S on each of which an image is formed, image data on an image to be formed on each of the media S, and a variety of control commands that comply with a command system of the image forming apparatus 1. The image forming apparatus 1 performs image formation by discharging the inks supplied from the interior of the ink container 19 onto a medium S conveyed along a conveyance path HK, which is formed in the apparatus main body 10 and will be described later.

The medium S on which an image has been formed is discharged via a discharge port 25, which is an opening provided between the operation panel 16 and the main body cassette 17 in the apparatus main body 10. A slidable discharge tray 26, which is formed of a plurality of plates configured to be extendable and retractable in the frontward-rearward direction, is provided at the bottom of the discharge port 25. The medium S discharged via the discharge port 25 is placed on the extended discharge tray 26.

FIG. 2 diagrammatically shows a side cross section of the image forming apparatus 1. The ink container 19 is omitted in FIG. 2.

The first additional cassette 21A, the second additional cassette 21B, and the third additional cassette 21C have substantially the same configuration. Therefore, in the description of the configuration of the additional cassettes 21 with reference to FIG. 2, the configuration of the first additional cassette 21A will be described as a representative additional cassette, and the configurations of the second additional cassette 21B and the third additional cassette 21C will not be described as appropriate.

The apparatus main body 10 includes a first main body conveyer 27. The first main body conveyer 27 conveys in a conveyance direction H a medium S conveyed from the main body cassette 17 or any of the additional cassettes 21. The first main body conveyer 27 includes a first main body conveying roller pair 271, a second main body conveying roller pair 272, and a third main body conveying roller pair 273. The first main body conveying roller pair 271, the second main body conveying roller pair 272, and the third main body conveying roller pair 273 each include a rotary roller rotated by motor power and a driven roller driven by the rotation of the rotary roller. The second main body conveying roller pair 272 is provided downstream from the first main body conveying roller pair 271 in the conveyance direction H of the medium S. The third main body conveying roller pair 273 is provided downstream from the second main body conveying roller pair 272 in the conveyance direction H of the medium S.

The image forming apparatus 1 includes an image forming unit 28. The image forming unit 28 is provided between the second main body conveying roller pair 272 and the third main body conveying roller pair 273 in the conveyance direction H, as shown in FIG. 2. The image forming unit 28 includes a carriage 281 and an inkjet head 282 mounted on the carriage 281.

The carriage 281 is supported by a carriage shaft 283 extending in a direction perpendicular to the conveyance direction H, and moves the inkjet head 282 along the carriage shaft 283 in the direction perpendicular to the conveyance direction H.

The inkjet head 282 includes, for example, nozzle rows corresponding to four colors, CMYK. The inkjet head 282 receives the inks supplied from the ink container 19 and discharges the inks from nozzles provided in the nozzle rows to form an image on the medium S.

In the conveyance path HK of the medium S, a platen 29 is provided at a position where the platen 29 faces the inkjet head 282. The platen 29 extends over the range where the inkjet head 282 can form an image, and flattens and supports the medium S in such a way that the surface of the medium S placed at the platen 29 is perpendicular to the discharge direction in which the inks are discharged from the inkjet head 282.

The apparatus main body 10 includes a second main body conveyer 30. The second main body conveyer 30 conveys the media S contained in the main body cassette 17 one by one to the first main body conveyer 27. The second main body conveyer 30 includes a main body pickup roller 301 and a main body separation roller pair 302. The main body pickup roller 301 is a roller that feeds from the main body tray 171 the medium S located at the top of the media S placed in the main body tray 171. Even when a plurality of the media S stacked on each other are fed by the main body pickup roller 301, the main body separation roller pair 302 conveys the media S one by one toward the first main body conveyer 27. The main body separation roller pair 302 includes a rotary roller and a driven roller driven by the rotation of the rotary roller. The main body cassette 17 includes a hopper plate 173, on which the media S are placed in the main body tray 171. In the main body cassette 17, the hopper plate 173 tilts, so that the media S contained in the main body tray 171 are pressed against the main body pickup roller 301. The main body cassette 17 in the present embodiment causes the hopper plate 173 to tilt by mechanically driving the hopper plate 173 with a force produced when the main body cassette 17 is inserted into the recess 18.

The first additional cassette 21A includes an additional conveyer 31. The additional conveyor 31 conveys the media S contained in the additional tray 23 one by one to the apparatus main body 10. The additional conveyor 31 includes an additional pickup roller 311, an additional separation roller pair 312, and an additional conveying roller pair 313.

The additional pickup roller 311 is a roller that feeds from the additional tray 23 the medium S located at the top of the media S placed in the additional tray 23.

Even when a plurality of the media S stacked on each other are fed by the additional pickup roller 311, the additional separation roller pair 312 conveys the media S one by one toward the additional conveying roller pair 313. The additional separation roller pair 312 includes a rotary roller and a driven roller driven by the rotation of the rotary roller.

The additional conveying roller pair 313 includes a rotary roller and a driven roller. The additional conveying roller pair 313 conveys the medium S conveyed from the additional separation roller pair 312 to the apparatus main body 10 installed at a position upwardly adjacent to the first additional cassette 21A. The additional conveying roller pair 313 further conveys a medium S conveyed from the additional cassette 21B installed below the first additional cassette 21A to the apparatus main body 10 installed at the position upwardly adjacent to the first additional cassette 21A.

The additional conveying roller pair 313 of the second additional cassette 21B conveys a medium S contained in the second additional cassette 21B or a medium S conveyed from the third additional cassette 21C to the first additional cassette 21A. The additional conveying roller pair 313 of the third additional cassette 21C conveys a medium S contained in the third additional cassette 21C to the second additional cassette 21B.

The first additional cassette 21A, in which the hopper plate 32 tilts, causes the media S to be pressed against the additional pickup roller 311. The first additional cassette 21A causes the hopper plate 32 to tilt by electrically driving the hopper plate 32, so that the media S are pressed against the additional pickup roller 311.

The configuration of a control system of the image forming apparatus 1 will next be described.

Figure 3:
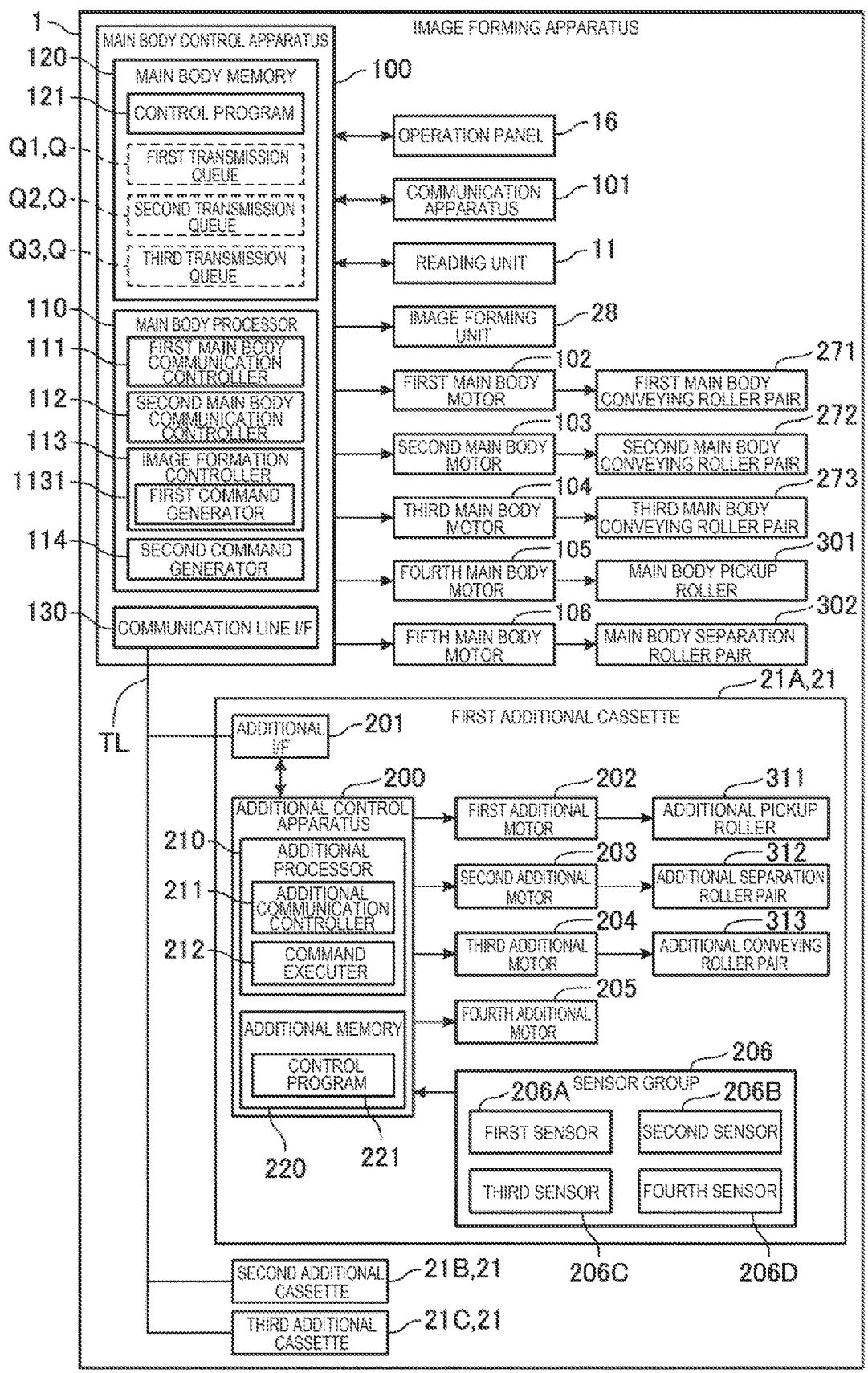
FIG. 3 is a block diagram showing the configuration of a control system of the image forming apparatus.

FIG. 3 is a block diagram showing the configuration of the control system of the image forming apparatus 1.

The image forming apparatus 1 includes a main body control apparatus 100, as shown in FIG. 3.

The main body control apparatus 100 includes a main body processor 110, such as a CPU (central processing unit), which executes a program, a main body memory 120, and a communication line I/F 130. I/F is an abbreviation for interface. The main body control apparatus 100, in which the main body processor 110 reads and executes a control program 121 stored in the main body memory 120, controls each portion of the image forming apparatus 1. The main body processor 110 executes the control program 121 stored in the main body memory 120 to function as a first main body communication controller 111, a second main body communication controller 112, an image formation controller 113, and a second command generator 114.

The main body control apparatus 100 is an example of a "control apparatus". The main body memory 120 is an example of a "storage".

The main body memory 120 is a memory that stores the control program 121, other programs executed by the main body processor 110, data processed by the main body processor 110, and other pieces of information. The main body memory 120 has a nonvolatile storage area. The main body memory 120 may have a volatile storage area to form a work area for the main body processor 110.

The communication line I/F 130 includes a connector, a communication circuit, and other types of communication hardware. A bus-shaped communication line TL, to which the additional cassettes 21 can be coupled, is coupled to the communication line I/F 130. In other words, the additional cassettes 21 are coupled via a bus-shaped line to the communication line I/F 130. The main body control apparatus 100 communicates with the additional cassettes 21 via the communication line TL.

The image forming apparatus 1 includes the operation panel 16, a communication apparatus 101, the reading unit 11, the image forming unit 28, a first main body motor 102, a second main body motor 103, a third main body motor 104, a fourth main body motor 105, and a fifth main body motor 106. The operation panel 16, the communication apparatus 101, the reading unit 11, the image forming unit 28, the first main body motor 102, the second main body motor 103, the third main body motor 104, the fourth main body motor 105, and the fifth main body motor 106 are coupled to the main body control apparatus 100.

The operation panel 16 displays a variety of pieces of information on the display under the control of the main body control apparatus 100. The operation panel 16 outputs a signal corresponding to operation performed on any of the operation switches to the main body control apparatus 100.

The communication apparatus 101 includes communication hardware, such as a communication circuit compliant with a predetermined communication standard, and communicates with an external instrument separate from the image forming apparatus 1 in accordance with the predetermined communication standard.

The reading unit 11 reads the document D under the control of the main body control apparatus 100.

The image forming unit 28 drives the inkjet head 282 and the carriage 281 under the control of the main body control apparatus 100 to form an image on the medium S.

The first main body motor 102 is coupled to the first main body conveying roller pair 271 via a power transmission mechanism. The main body control apparatus 100 drives the first main body motor 102 to rotate the rotary roller of the first main body conveying roller pair 271.

The second main body motor 103 is coupled to the second main body conveying roller pair 272 via a power transmission mechanism. The main body control apparatus 100 drives the second main body motor 103 to rotate the rotary roller of the second main body conveying roller pair 272.

The third main body motor 104 is coupled to the third main body conveying roller pair 273 via a power transmission mechanism. The main body control apparatus 100 drives the third main body motor 104 to rotate the rotary roller of the third main body conveying roller pair 273.

The fourth main body motor 105 is coupled to the main body pickup roller 301 via a power transmission mechanism. The main body control apparatus 100 drives the fourth main body motor 105 to rotate the main body pickup roller 301.

The fifth main body motor 106 is coupled to the main body separation roller pair 302 via a power transmission mechanism. The main body control apparatus 100 drives the fifth main body motor 106 to rotate the rotary roller of the main body separation roller pair 302.

As described above, the main body processor 110 functions as the first main body communication controller 111, the second main body communication controller 112, the image formation controller 113, and the second command generator 114. The image formation controller 113 functions as a first command generator 1131.

The first main body communication controller 111 communicates with the external instrument via the communication apparatus 101. For example, the first main body communication controller 111 receives the image formation data from the external instrument.

Before the second main body communication controller 112 is described, the image forming controller 113 and the second command generator 114 will be described.

The image formation controller 113 performs image formation based on the image formation data received by the first main body communication controller 111. The image formation is a process including the conveyance of a medium S and formation of an image on the medium S.

The image formation controller 113 controls the image forming unit 28, the first main body motor 102, the second main body motor 103, and the third main body motor 104 to perform the image formation.

When the image formation controller 113 performs the image formation on the media S contained in the main body cassette 17, the image formation controller 113 further controls the fourth main body motor 105 and the fifth main body motor 106 to convey a medium S contained in the main body cassette 17 and form an image on the medium S.

When performing the image formation on a medium S contained in any of the additional cassettes 21, the image formation controller 113 outputs a command that is an example of "data" to the additional cassette 21 to cause the additional cassette 21 to convey the medium S. The image formation controller 113 then performs the image formation on the medium S conveyed from the additional cassette 21.

The first command generator 1131 generates commands to be outputted to the additional cassettes 21. The first command generator 1131 causes the main body memory 120 to store the generated commands. In the storage area of the main body memory 120, a transmission queue Q is formed for each of the additional cassettes 21 added to the apparatus main body 10. The transmission queue Q is a storage area that temporarily stores a command to be outputted to the additional cassette 21. The following three transmission queues are formed in the main body memory 120 in the present embodiment: a first transmission queue Q1 corresponding to the first additional cassette 21A; a second transmission queue Q2 corresponding to the second additional cassette 21B; and a third transmission queue Q3 corresponding to the third additional cassette 21C. When generating a command to be outputted to the first additional cassette 21A, the first command generator 1131 causes the first transmission queue Q1 to store the generated command. When generating a command to be outputted to the second additional cassette 21B, the first command generator 1131 causes the second transmission queue Q2 to store the generated command. When generating a command to be outputted to the third additional cassette 21C, the first command generator 1131 causes the third transmission queue Q3 to store the generated command.

In the present embodiment, a command generated by the first command generator 1131 is a hardware-based command.

A hardware-based command is a command relating to hardware provided in the additional cassettes 21. In the present embodiment, the hardware-based command includes a first mechanism drive command, a second mechanism drive command, a third mechanism drive command, a fourth mechanism drive command, a first sensor command, a second sensor command, a third sensor command, and a fourth sensor command.

The first mechanism drive command is a command that instructs driving the additional pickup roller 311. The first mechanism drive command specifies, for example, the amount of rotation of the additional pickup roller 311.

The second mechanism drive command is a command that instructs driving the additional separation roller pair 312. The second mechanism drive command specifies, for example, the amount of rotation of the rotary roller of the additional separation roller pair 312.

The third mechanism drive command is a command that instructs driving the additional conveying roller pair 313. The third mechanism drive command specifies, for example, the amount of rotation of the rotary roller of the additional conveying roller pair 313.

The fourth mechanism drive command is a command that instructs driving the hopper plate 32.

The first sensor command is a command that requests a value detected by a first sensor 206A.

The first sensor 206A is a sensor that detects whether or not the additional tray 23 contains the media S.

The second sensor command is a command that requests a value detected by a second sensor 206B.

The second sensor 206B is a sensor that detects the position of the media S in the additional tray 23.

The third sensor command is a command that requests a value detected by a third sensor 206C.

The third sensor 206C is a sensor that detects the size of the media S contained in the additional tray 23.

The fourth sensor command is a command that requests a value detected by a fourth sensor 206D.

The fourth sensor 206D is a sensor that detects whether or not the additional tray 23 is present.

In the following description, when the first mechanism drive command, the second mechanism drive command, the third mechanism drive command, the fourth mechanism drive command, the first sensor command, and the second sensor command are not distinguished from one another, the commands are collectively referred to as "image formation action commands". The image formation action commands are commands relating to image formation action performed by the image forming apparatus 1.

When generating a command, the first command generator 1131 associates a flag representing that an ACK is necessary with the generated command. The first command generator 1131 associates a single flag representing that an ACK is necessary with each hardware-based command.

The second command generator 114 generates commands to be output to the additional cassettes 21. The commands to be output to the additional cassettes 21 are each an example of the "data". When generating a command to be outputted to the first additional cassette 21A, the second command generator 114 causes the first transmission queue Q1 to store the generated command. When generating a command to be outputted to the second additional cassette 21B, the second command generator 114 causes the second transmission queue Q2 to store the generated command. When generating a command to be outputted to the third additional cassette 21C, the second command generator 114 causes the third transmission queue Q3 to store the generated command.

In the present embodiment, a command generated by the second command generator 114 is a software-based command. A software-based command is a command relating to software for the additional cassettes 21. In the present embodiment, the software-based command includes a first firmware command, a second firmware command, and a time setting command.

The first firmware command is a command that requests the version of the firmware for the additional cassettes 21.

The second firmware command is a command that instructs updating the firmware for the additional cassettes 21.

The time setting command is a command that instructs the additional cassettes 21 to set the time.

When generating a command, the second command generator 114 associates a single flag representing whether or not an ACK is necessary with the command to be generated.

The second main body communication controller 112 will be described.

The second main body communication controller 112 communicates with the additional cassettes 21 coupled to the communication line TL via the communication line I/F 130 and the communication line TL. The second main body communication controller 112 transmits the commands stored in the transmission queues Q to the additional cassettes 21. The second main body communication controller 112 monitors each of the transmission queues Q and transmits the command stored in the transmission queue Q to the additional cassette 21 corresponding to the transmission queue Q. The transmission action of the second main body communication controller 112 will be described later in detail. When any of the additional cassettes 21 transmits an ACK (acknowledgement), which is an acknowledgement, the second main body communication controller 112 receives the ACK from the additional cassette 21.

The configuration of a control system of each of the additional cassettes 21 will next be described with reference to FIG. 3.

The first additional cassette 21A, the second additional cassette 21B, and the third additional cassette 21C have substantially the same configuration. Therefore, in the description of the configuration of the additional cassettes 21 with reference to FIG. 3, the configuration of the first additional cassette 21A will be described as a representative additional cassette, and the configurations of the second additional cassette 21B and the third additional cassette 21C will not be described.

The first additional cassette 21A includes an additional control apparatus 200. The additional control apparatus 200 includes an additional processor 210, such as a CPU, which executes a program, and an additional memory 220. In the additional control apparatus 200, the additional processor 210 reads and executes a control program 221 stored in the additional memory 220 to control each portion of the first additional cassette 21A. The additional processor 210 executes the control program 221 stored in the additional memory 220 to function as an additional communication controller 211 and a command executer 212.

The additional memory 220 is a memory that stores the control program 221, other programs executed by the additional processor 210, data processed by the additional processor 210, and other pieces of information. The additional memory 220 has a nonvolatile storage area. The additional memory 220 may have a volatile storage area to form a work area for the additional processor 210.

The first additional cassette 21A includes an additional I/F 201. The additional I/F 201 includes a connector and other types of communication hardware. The additional I/F 201 is coupled to the bus-shaped communication line TL and communicates with the main body control apparatus 100 via the communication line TL.

The first additional cassette 21A includes a first additional motor 202, a second additional motor 203, a third additional motor 204, and a fourth additional motor 205. The motors are coupled to the additional control apparatus 200.

The first additional motor 202 is coupled to the additional pickup roller 311 via a power transmission mechanism. The additional control apparatus 200 drives the first additional motor 202 to rotate the additional pickup roller 311.

The second additional motor 203 is coupled to the additional separation roller pair 312 via a power transmission mechanism. The additional control apparatus 200 drives the second additional motor 203 to rotate the rotary roller of the additional separation roller pair 312.

The third additional motor 204 is coupled to the additional conveying roller pair 313 via a power transmission mechanism. The additional control apparatus 200 drives the third additional motor 204 to rotate the rotary roller of the additional conveying roller pair 313.

The fourth additional motor 205 tilts the hopper plate 32 via a power transmission mechanism. The additional control apparatus 200 drives the fourth additional motor 205 to tilt the hopper plate 32.

The first additional cassette 21A includes a sensor group 206. The sensor group 206 includes the first sensor 206A, the second sensor 206B, the third sensor 206C, and the fourth sensor 206D, and outputs values detected by the sensors to the additional control apparatus 200.

The additional processor 210 functions as the additional communication controller 211 and the command executer 212, as described above.

The additional communication controller 211 communicates with the main body control apparatus 100 via the additional I/F 201. The additional communication controller 211 receives a command from the main body control apparatus 100. When a single flag representing that an ACK is necessary is associated with the command received from the main body control apparatus 100, the additional communication controller 211 transmits a single ACK to the main body control apparatus 100.

The command executer 212 executes the command received by the additional communication controller 211. When the command received by the additional communication controller 211 is corrupted, the command executer 212 discards the command. The command corruption detection is performed by using an existing method, such as a hash function and a checksum.

When the command received by the additional communication controller 211 is the first mechanism drive command, the command executer 212 drives the first additional motor 202 to rotate the additional pickup roller 311 by the amount of rotation specified in the first mechanism drive command.

When the command received by the additional communication controller 211 is the second mechanism drive command, the command executer 212 drives the second additional motor 203 to rotate the rotary roller of the additional separation roller pair 312 by the amount of rotation specified in the second mechanism drive command.

When the command received by the additional communication controller 211 is the third mechanism drive command, the command executer 212 drives the third additional motor 204 to rotate the rotary roller of the additional conveying roller pair 313 by the amount of rotation specified in the third mechanism drive command.

When the command received by the additional communication controller 211 is the fourth mechanism drive command, the command executer 212 drives the fourth additional motor 205 to tilt the hopper plate 32.

When the command received by additional communication controller 211 is the first sensor command, the command executer 212 outputs the value detected by the first sensor 206A to the additional communication controller 211. The additional communication controller 211 outputs the outputted value detected by the first sensor 206A to the main body control apparatus 100.

When the command received by additional communication controller 211 is the second sensor command, the command executer 212 outputs the value detected by the second sensor 206B to the additional communication controller 211. The additional communication controller 211 outputs the outputted value detected by the second sensor 206B to the main body control apparatus 100.

When the command received by additional communication controller 211 is the third sensor command, the command executer 212 outputs the value detected by the third sensor 206C to the additional communication controller 211. The additional communication controller 211 outputs the outputted value detected by the third sensor 206C to the main body control apparatus 100.

When the command received by additional communication controller 211 is the fourth sensor command, the command executer 212 outputs the value detected by the fourth sensor 206D to the additional communication controller 211. The additional communication controller 211 outputs the outputted value detected by the fourth sensor 206D to the main body control apparatus 100.

When the command received by the additional communication controller 211 is the first firmware command, the command executer 212 causes the additional communication controller 211 to transmit information representing the version of the firmware for the additional cassettes 21 to the main body control apparatus 100.

When the command received by the additional communication controller 211 is the second firmware command, the command executer 212 updates the firmware for the additional cassettes 21.

When the command received by the additional communication controller 211 is the time setting command, the command executer 212 sets the time measured by the additional cassettes 21.

The action of the image forming apparatus 1 will next be described.

The action of the image forming apparatus 1 involved in exclusive control performed on the additional cassettes 21 will first be described. In the image forming apparatus 1, when the main body control apparatus 100 communicates with one additional cassette 21, the main body control apparatus 100 performs exclusive control on the one additional cassette 21. The exclusive control avoids data collision in the communication line TL in the case where a plurality of additional cassettes 21 are coupled to the communication line TL.

The second main body communication controller 112 transmits a communication right grant command to the additional cassette 21 under the exclusive control. The communication right grant command is a command for granting a communication right for exclusive communication control, that is, the exclusive control. The transmission of the communication right grant command causes the main body control apparatus 100 to start the exclusive control of the additional cassette 21 to which the communication right grant command has been transmitted. Note that a flag representing that an ACK is necessary is associated with the communication right grant command.

The additional communication controller 211 of the additional cassette 21 on which the exclusive control is performed transmits a communication right return command to the main body control apparatus 100 when a predetermined trigger occurs. The communication right return command is a command for returning the communication right for the exclusive control. The transmission of the communication right return command causes the image forming apparatus 1 to terminate the exclusive control of the additional cassette 21 that has transmitted the communication right return command. Note that a flag representing that an ACK is necessary is associated with the communication right return command.

The action of the second main body communication controller 112 involved in the transmission of the commands stored in the transmission queues Q will next be described.

FIG. 4 is a flowchart showing the action of the second main body communication controller 112.

In the action shown in FIG. 4, the transmission queue Q corresponding to the additional cassette 21 under the exclusive control is processed.

The second main body communication controller 112 evaluates whether or not a command has been stored in the transmission queue Q being processed (step SA1).

When the result of the evaluation shows that no command has been stored in the transmission queue Q being processed (NO in step SA1), the second main body communication controller 112 performs the evaluation in step SA1 again.

On the other hand, when the result of the evaluation shows that a command has been stored in the transmission queue Q being processed (YES in step SA1), the second main body communication controller 112 evaluates whether or not a plurality of commands have been stored in the transmission queue Q being processed (step SA2).

When the result of the evaluation shows that a plurality of commands have not been stored in the transmission queue Q being processed (NO in step SA2), the second main body communication controller 112 transmits the command stored in the transmission queue Q to the additional cassette 21 (step SA3).

Returning to the description of step SA2, when the result of the evaluation shows that a plurality of commands have been stored in the transmission queue Q being processed (YES in step SA2), the second main body communication controller 112 evaluates whether or not the total amount of data on the commands stored in the transmission queue Q being processed is greater than or equal to a predetermined threshold (step SA4). The predetermined threshold is appropriately specified, for example, by a prior test or simulation from the viewpoints of preventing delay of transmission of the command stored in the transmission queue Q.

When the result of the evaluation shows that the total amount of data on the commands stored in the transmission queue Q being processed is smaller than the predetermined threshold (NO in step SA4), the second main body communication controller 112 transmits the first command of the commands stored in the transmission queue Q being processed to the additional cassette 21 (step SA5). The first command is a command stored first among the commands stored in the transmission queue Q.

On the other hand, when the total amount of data on the commands stored in the transmission queue Q being processed is greater than or equal to the predetermined threshold (YES in step SA4), the second main body communication controller 112 generates a first combined command (step SA6).

The first combined command is a command that is the combination of the plurality of commands stored in the transmission queue Q being processed. The plurality of commands contained in the first combined command are so listed in the first combined command that the commands are processed in the same order as the commands are stored in the transmission queue Q.

The first combined command is an example of "first combined data".

When generating the first combined command, the second main body communication controller 112 associates a single flag representing that an ACK is necessary with the generated first combined command. At this point, the second main body communication controller 112 does not associate the flag representing that an ACK is necessary with each of the plurality of commands contained in the first combined command.

Upon the generation of the first combined command, the second main body communication controller 112 transmits the generated first combined command to the additional cassettes 21 (step SA7).

As described with reference to FIG. 4, the second main body communication controller 112 transmits the first combined command to the additional cassette 21. The plurality of commands stored in the transmission queue Q can thus be transmitted with a reduced overhead of the commands transmitted from the main body control apparatus 100 to the additional cassette 21.

The action of the image forming apparatus 1 taken when performing the image formation on the media S contained in the plurality of additional cassettes 21 will next be described.

FIG. 5 is a sequence diagram showing an example of the action of the image forming apparatus 1.

The action shown in the sequence diagram of FIG. 5 shows by way of example communication with each of the additional cassettes 21 in the following order: the first additional cassette 21A; the second additional cassette 21B; and the third additional cassette 21C. In the example shown in FIG. 5, as the exclusive control target is switched from one to another, the second main body communication controller 112 switches the transmission queue Q for which the processes shown in FIG. 4 are carried out to the first transmission queue Q1, the second transmission queue Q2, and the third transmission queue Q3 in this order.

The second main body communication controller 112 of the main body control apparatus 100 transmits the communication right grant command to the first additional cassette 21A (step SB1). The image forming apparatus 1 thus starts the exclusive control of the first additional cassette 21A.

The additional communication controller 211 of the first additional cassette 21A receives the communication right grant command and transmits an ACK to the main body control apparatus 100 in response to the communication right grant command (step SB2).

The example shown in FIG. 5 shows by way of example a case where when the transmission in step SB3 is performed, a single command has been stored in the first transmission queue Q1. The second main body communication controller 112 of the main body control apparatus 100 therefore transmits the single command stored in the first transmission queue Q1 to the first additional cassette 21A (step SB3).

The additional communication controller 211 of the first additional cassette 21A transmits an ACK to the main body control apparatus 100 in response to the command transmitted in step SB3 (step SB4).

The example shown in FIG. 5 shows by way of example a case where when the transmission in step SB5 is performed, a plurality of commands are stored in the first transmission queue Q1, and the amount of data on the plurality of commands stored in the first transmission queue Q1 is greater than or equal to the predetermined threshold. The second main body communication controller 112 therefore transmits the first combined command to the first additional cassette 21A (step SB5).

The additional communication controller 211 of the first additional cassette 21A transmits an ACK to the main body control apparatus 100 in response to the first combined command transmitted in step SB5 (step SB6).

In step SB6 and the following steps, the second main body communication controller 112 transmits the commands that are not combined with one another or the first combined command to the first additional cassette 21A in accordance with the action shown in FIG. 4.

The additional communication controller 211 of the first additional cassette 21A transmits the communication right return command to the main body control apparatus 100 (step SB7). The image forming apparatus 1 thus terminates the exclusive control of the first additional cassette 21A.

The second main body communication controller 112 of the main body control apparatus 100 transmits an ACK in response to the communication right return command (step SB8).

The second main body communication controller 112 then transmits the communication right grant command to the second additional cassette 21B (step SB9). The image forming apparatus 1 thus starts the exclusive control of the second additional cassette 21B.

The additional communication controller 211 of the second additional cassette 21B receives the communication right grant command and transmits an ACK to the main body control apparatus 100 in response to the communication right grant command (step SB10).

In step SB10 and the following steps, the second main body communication controller 112 transmits the commands that are not combined with one another or the first combined command to the second additional cassette 21B in accordance with the action shown in FIG. 4.

The additional communication controller 211 of the second additional cassette 21B transmits the communication right return command to the main body control apparatus 100 (step SB11). The image forming apparatus 1 thus terminates the exclusive control of the second additional cassette 21B.

The second main body communication controller 112 of the main body control apparatus 100 transmits an ACK in response to the communication right return command (step SB12).

The second main body communication controller 112 then transmits the communication right grant command to the third additional cassette 21C (step SB13). The image forming apparatus 1 thus starts the exclusive control of the third additional cassette 21C.

The additional communication controller 211 of the third additional cassette 21C receives the communication right grant command and transmits an ACK to the main body control apparatus 100 in response to the communication right grant command (step SB14).

In step SB14 and the following steps, the second main body communication controller 112 transmits the commands that are not combined with one another or the first combined command to the third additional cassette 21C in accordance with the action shown in FIG. 4.

The additional communication controller 211 of the third additional cassette 21C transmits the communication right return command to the main body control apparatus 100 (step SB15). The image forming apparatus 1 thus terminates the exclusive control of the third additional cassette 21C.

The second main body communication controller 112 of the main body control apparatus 100 transmits an ACK to the third additional cassette 21C in response to the communication right return command (step SB16).

As described with reference to FIG. 5, the second main body communication controller 112 can transmit the first combined command to the additional cassettes 21 in the image formation. The image forming apparatus 1 can thus speed up the control of the additional cassettes 21 in the image formation. The image forming apparatus 1 can thus speed up the image formation.

Other embodiments of the present disclosure will be described.

Second Embodiment

The second main body communication controller 112 in the first embodiment evaluates whether or not to generate the first combined command based on the total amount of data on the plurality of commands stored in the transmission queues Q. The second main body communication controller 112 in the second embodiment evaluates whether or not to generate the first combined command based on the type of the commands stored in the transmission queues Q.

FIG. 6 is a flowchart showing the action of the second main body communication controller 112 in the second embodiment. In FIG. 6, the same steps as those in the flowchart shown in FIG. 4 have the same step numbers, and will not be described in detail as appropriate.

When the result of the evaluation shows that a plurality of commands have been stored in the transmission queue Q being processed (YES in step SA2), the second main body communication controller 112 evaluates whether or not the plurality of commands stored in the transmission queue Q being processed include an image formation action command (step SC1).

When the result of the evaluation shows that the plurality of commands stored in the transmission queue Q being processed does not include the image formation action command (NO in step SC1), the second main body communication controller 112 transmits the first command of the commands stored in the transmission queue Q being processed to the additional cassette 21 (step SA5).

On the other hand, when the result of the evaluation shows that the plurality of commands stored in the transmission queue Q being processed includes the image formation action command (YES in step SC1), the second main body communication controller 112 generates a first combined command (step SA6).

Third Embodiment

The second main body communication controller 112 in a third embodiment differs from the second main body communication controller 112 in the first and second embodiments in terms of the action after the command transmission.

FIG. 7 is a flowchart showing the action of the second main body communication controller 112 in the third embodiment. In FIG. 7, the same steps as those in the flowchart shown in FIG. 4 have the same step numbers, and will not be described in detail as appropriate. In the action shown in FIG. 7, the transmission queue Q corresponding to the additional cassette 21 under the exclusive control is processed, as in the action shown in FIG. 4. The second main body communication controller 112 in the third embodiment may execute step SC1 described in the second embodiment in place of step SA4 shown in FIG. 7.

After the command transmission in any of steps SA3, SA5, and SA7, the second main body communication controller 112 evaluates whether or not an error has occurred in the transmission in any of steps SA3, SA5, and SA7 (step SD1).

When the result of the evaluation shows that no error has occurred (NO in step SD1), the second main body communication controller 112 returns to the process in step SA1 and carries out the processes in step SA1 and the following steps.

On the other hand, when the result of the evaluation shows that an error has occurred (YES in step SD1), the second main body communication controller 112 evaluates whether or not a new command has been stored within a predetermined period in the transmission queue Q being processed (step SD2).

When the result of the evaluation shows that a new command has not been stored within the predetermined period (NO in step SD2), the second main body communication controller 112 retransmits the command having causes the transmission error (step SD3).

When the result of the evaluation shows that a new command has been stored within the predetermined period (YES in step SD2), the second main body communication controller 112 generates a second combined command (step SD4).

The second combined command is a command that is the combination of the command having causes the transmission error and the command having been newly stored in the transmission queue Q being processed. The plurality of commands contained in the second combined command are so listed in the second combined command that the commands are processed in the same order as the commands are stored in the transmission queue Q.

The second combined command is an example of "second combined data".

When generating the second combined command, the second main body communication controller 112 associates a single flag representing that an ACK is necessary with the generated second combined command. At this point, the second main body communication controller 112 does not associate the flag representing that an ACK is necessary with each of the plurality of commands contained in the second combined command.

Upon the generation of the second combined command, the second main body communication controller 112 transmits the generated second combined command to the additional cassettes 21 (step SD5).

As described above, the image forming apparatus 1 includes the main body control apparatus 100 including the main body memory 120, the main body cassette 17, and the additional cassettes 21, which differ from the main body cassette 17 and are communicably coupled to the main body control apparatus 100. The main body memory 120 has the transmission queues Q, which are provided for the respective additional cassettes 21 communicably coupled to the main body control apparatus 100 and temporarily store commands to be transmitted to the additional cassettes 21. When a plurality of commands are stored in each of the transmission queues Q, the main body control apparatus 100 carries out for each of the transmission queues Q the process of generating the first combined command, which is the combination of the plurality of commands stored in the transmission queue Q, and transmitting the first combined command to the additional cassette 21.

The plurality of commands stored in each of the transmission queues Q can therefore be transmitted as a single command to reduce an overhead that occurs when the plurality of commands are transmitted. The period required to transmit the commands to the additional cassette 21 can therefore be reduced, whereby the image forming apparatus 1 can speed up the control of the additional cassettes 21.

The image forming apparatus 1 includes a plurality of additional cassettes 21. The plurality of additional cassettes 21 are coupled to the bus-shaped communication line TL, to which the main body control apparatus 100 is coupled. When the main body control apparatus 100 communicates with the plurality of additional cassettes 21, and a plurality of commands are stored in each of the transmission queues Q, the main body control apparatus 100 sequentially carries out for each of the transmission queues Q the process of generating the first combined command, which is the combination of the plurality of commands stored in the transmission queue Q, and transmitting the first combined command to the additional cassette 21.

According to the configuration described above, even when a plurality of additional cassettes 21 are coupled to the bus-shaped communication line TL, the control of the additional cassettes 21 can be sped up while data collisions in the communication line TL prevented.

The main body control apparatus 100 evaluates whether or not to generate the first combined command based on the total amount of data on the plurality of commands stored in each of the transmission queues Q, and when the result of the evaluation shows that the first combined command is generated, the main body control apparatus 100 generates the first combined command and transmits the first combined command to the additional cassette 21.

According to the configuration described above, evaluating whether or not to generate the first combined command based on the total amount of data on the plurality of commands stored in the transmit queues Q allows the control of the additional cassettes 21 to be appropriately sped up while unnecessary command combining operation suppressed.

The main body control apparatus 100 evaluates whether or not to generate the first combined command based on the type of the commands stored in each of the transmission queues Q, and when the result of the evaluation shows that the first combined command is generated, the main body control apparatus 100 generates the first combined command and transmits the first combined command to the additional cassette 21.

According to the configuration described above, evaluating whether or not to generate the first combined command based on the type of data stored in the transmit queues Q allows the control of the additional cassettes 21 to be appropriately sped up while unnecessary command combining operation suppressed.

When the plurality of commands stored in the transmission queues Q include the image formation action command, the main body control apparatus 100 determines that the first combined command is generated.

The period required to control the transmission of the image formation action command can thus be shortened, which can suppress occurrence of paper jams and other errors caused by delay in transmitting the image formation action command. The image forming apparatus 1 can therefore speed up the control of the additional cassettes 21, and suppress occurrence of paper jams and other errors caused by delay in transmitting the image formation action command.

When an error occurs in the transmission of a command to any of the additional cassettes 21, the main body control apparatus 100 generates the second combined command, which is the combination of a new command stored in the transmission queue Q and the command having caused the transmission error, and transmits the second combined command to the additional cassette 21.

According to the configuration described above, the command having caused the transmission error can be retransmitted as a single command including the new command stored in the transmission queue Q. The control of the additional cassettes 21 in the event of transmission error can thus be sped up.

A single flag representing that an acknowledgement is necessary is associated with the first combined command.

A single ACK thus suffices for the first combined command. ACKs are therefore not transmitted or received for each of the plurality of commands contained in the first combined command, whereby the control of the additional cassettes 21 can be further sped up, and the single ACK can ensure the reliability of the communication.

In the method for controlling the image forming apparatus 1 including the main body control apparatus 100 including the main body memory 120, the main body cassette 17, and the additional cassettes 2, which differ from the main body cassette 17 and are communicably coupled to the main body control apparatus 100, the main body memory 120 has the transmission queues Q, which are provided for the respective additional cassettes 21 communicably coupled to the main body control apparatus 100 and temporarily store commands to be transmitted to the additional cassettes 21, and when a plurality of commands are stored in each of the transmission queues Q, the main body control apparatus 100 carries out for each of the transmission queues Q the process of generating the first combined command, which is the combination of the plurality of commands stored in the transmission queue Q, and transmitting the first combined command to the additional cassette 21.

The same effects as those provided by the image forming apparatus 1 described above can thus be provided.

The embodiments described above only show specific examples to which the present disclosure is applied. The present disclosure is not limited to the configurations in the embodiments described above, and can be implemented in a variety of aspects to the extent that they do not depart from the substance of the present disclosure.

In the embodiments described above, each command is presented as data to be transmitted by the main body control apparatus 100 to any of the additional cassettes 21. The data to be transmitted by the main body control apparatus 100 to any of the additional cassettes 21 is, however, not limited to a command, and can, for example, be firmware update data or setting data to be set in the additional cassettes 21.

In the second embodiment described above, when the commands stored in the transmission queues Q include the image formation action command, the first combined command is generated. The type of the command that is the condition for generating the first combined command is, however, not limited to the image formation action command, and can be a command of any other type.

In the embodiments described above, the first combined command and the second combined command are generated as a command to be transmitted from the main body control apparatus 100 to any of the additional cassettes 21. However, a plurality of sets of data may be combined with one another as data to be transmitted from any of the additional cassettes 21 to the main body control apparatus 100, as in the embodiments described above. In this case, when the additional memory 220 stores a plurality of sets of data to be transmitted to the main body control apparatus 100, the additional communication controller 211 of the additional cassette 21 combines the plurality of sets of data with one another and transmits the combined data as single data to the main body control apparatus 100.

The embodiments described above show the case where the image forming apparatus 1 includes three additional cassettes 21 by way of example. The image forming apparatus 1, however, only needs to include one or more additional cassettes 21, and the number of additional cassettes 21 provided in the image forming apparatus 1 is not limited to three.

For example, the embodiments described above show the case where the image forming apparatus 1 is a multifunction machine. The image forming apparatus 1 is, however, not limited to a multifunctional machine, and may be any apparatus having at least an image forming function.

The embodiments described above show the case where the inkjet head 282 is a serial inkjet head, and the head that discharges inks onto a medium S may instead be a linear head or a lateral head. The image formation method used by the image forming apparatus 1 is not limited to the inkjet-type method. The inkjet head 282 is not limited to a head that discharges inks having the CMYK four colors, and may instead, for example, be a head that discharges inks having a larger number of colors, that is, the CMYK four colors to which special colors are added, or a head that can discharge a monochrome ink or inks having two colors.

The embodiments described above show the case where inks are supplied from the ink packs 20 to the inkjet head 282 by way of example, and the inkjet head 282 provided in the image forming apparatus 1 may instead have a configuration in which inks are supplied from ink cartridges, ink tanks, or the like.

The main body processor 110 and the additional processor 210 may each be formed of a single processor or a plurality of processors. The main body processor 110 and the additional processor 210 may each be hardware programmed so as to realize the corresponding functional sections. That is, the main body processor 110 and the additional processor 210 may each be formed, for example, of an ASIC (application specific integrated circuit) or an FPGA (field programmable gate array).

The portions of the image forming apparatus 1 shown in FIG. 3 are presented by way of example and are each not necessarily implemented in a specific form. That is, hardware corresponding to each of the portions is not necessarily implemented, and a single processor that executes a program can, of course, achieve the functions of the portions. Furthermore, part of the functions achieved by software in the embodiments described above may be achieved by hardware, or part of the functions achieved by hardware in the embodiments described above may be achieved by software. In addition, the specific detailed configuration of each of the other portions of the image forming apparatus 1 can be changed in any way.

The step units of the action shown in FIGS. 4, 5, 6, and 7 are step units divided in accordance with the contents of primary processes for easy understanding of the actions of the portions of the image forming apparatus 1. How to produce the divided process units or the names of the process units do not limit the present disclosure. Any of the processes may be further divided into a larger number of step units in accordance with the content of the process. The step units may each be further divided into a large number of processes. The order of the steps may be interchanged as appropriate to the extent that the interchanged order does not interfere with the intent of the present disclosure.

What is claimed is:

1. An image forming apparatus comprising:
a main body control apparatus including a storage;
a first cassette; and
a second cassette different from the first cassette including
an additional control apparatus communicably coupled to the main body control apparatus,
wherein the storage has transmission queues that temporarily store commands to be transmitted to the additional control apparatus of the second cassette, and
when a plurality of sets of commands are stored in the transmission queues, the main body control apparatus carries out for each of the transmission queues the process of generating a first combined command that is a combination of the plurality of sets of commands stored in the transmission queues, and transmitting the first combined command to the additional control apparatus, and
the second cassette is controlled by the additional control apparatus based on the first combined command.

2. The image forming apparatus according to claim 1,
wherein the second cassette is formed of a plurality of second cassettes, and
the storage has the transmission queues for each of the plurality of second cassettes communicably coupled to the main body control apparatus,
the plurality of second cassettes are coupled to a bus-shaped communication line to which the main body control apparatus is coupled, and
the main body control apparatus carries out the process for each of the transmission queues in sequence to communicate with the plurality of second cassettes.

3. The image forming apparatus according to claim 1,
wherein the main body control apparatus
evaluates whether or not to generate the first combined command based on a total amount of commands on the plurality of sets of commands stored in the transmission queues, and
when determining to generate the first combined command, generates the first combined command and transmits the first combined command to the second cassette.

4. The image forming apparatus according to claim 1,
wherein the main body control apparatus
evaluates whether or not to generate the first combined command based on a type of the commands stored in the transmission queues, and
when determining to generate the first combined command, generates the first combined command and transmits the first combined command to the second cassette.

5. The image forming apparatus according to claim 4,
wherein the main body control apparatus determines to generate the first combined command when the plurality of commands stored in the transmission queues include commands involved in image formation performed by the image forming apparatus.

6. The image forming apparatus according to claim 1, wherein when an error occurs in the transmission of the first combined command to the second cassette, the main body control apparatus generates a second combined command that is a combination of new commands stored in the transmission queues and the first combined command having caused the transmission error, and transmits the second combined command to the second cassette.

7. The image forming apparatus according to claim 1, wherein a single flag representing that an acknowledgement is necessary is associated with the first combined command.

8. A method for controlling an image forming apparatus including a control apparatus including a storage, a first cassette, and second cassettes different from the first cassette and communicably coupled to the control apparatus,
wherein the storage has the transmission queues that temporarily store data to be transmitted to the second cassettes for each of the second cassettes communicably coupled to the control apparatus, and
when a plurality of sets of data are stored in the transmission queues, the control apparatus carries out for each of the transmission queues the process of generating first combined data that is a combination of the plurality of sets of data stored in the transmission queues, and transmitting the first combined data to the second cassettes, and
wherein the second cassette is formed of a plurality of second cassettes, and
the storage has the transmission queues for each of the plurality of second cassettes communicably coupled to the control apparatus,
the plurality of second cassettes are coupled to a bus-shaped communication line to which the control apparatus is coupled, and
the control apparatus carries out the process for each of the transmission queues in sequence to communicate with the plurality of second cassettes.

9. An image forming apparatus comprising:
a control apparatus including a storage;
a first cassette; and
a second cassette different from the first cassette and communicably coupled to the control apparatus,
wherein the storage has transmission queues that temporarily store data to be transmitted to the second cassette, and
when a plurality of sets of data are stored in the transmission queues, the control apparatus carries out for each of the transmission queues the process of generating first combined data that is a combination of the plurality of sets of data stored in the transmission queues, and transmitting the first combined data to the second cassette, and
wherein the second cassette is formed of a plurality of second cassettes, and
the storage has the transmission queues for each of the plurality of second cassettes communicably coupled to the control apparatus,
the plurality of second cassettes are coupled to a bus-shaped communication line to which the control apparatus is coupled, and
the control apparatus carries out the process for each of the transmission queues in sequence to communicate with the plurality of second cassettes.

* * * * *